United States Patent
Gershony

Patent Number: 5,519,792
Date of Patent: May 21, 1996

[54] METHOD AND APPARATUS FOR GENERATING A SCREENED REPRODUCTION OF AN IMAGE BY DIGITAL INTERPOLATION

[75] Inventor: Moshe Gershony, Kfar Sava, Israel

[73] Assignee: Scitex Corporation Ltd., Herzliya, Israel

[21] Appl. No.: 204,735

[22] Filed: Mar. 2, 1994

[51] Int. Cl.$^6$ ........................................ G06K 9/40
[52] U.S. Cl. ..................... 382/254; 382/270; 358/456
[58] Field of Search ........................... 382/54, 50, 52, 382/53, 34, 254, 270, 272, 273, 218, 300; 358/456, 457, 459, 298; 364/723; 395/103

[56] References Cited

U.S. PATENT DOCUMENTS

| | | | |
|---|---|---|---|
| 4,149,183 | 4/1979 | Pellar | 358/75 |
| 4,456,924 | 6/1984 | Rosenfeld | 358/75 |
| 5,055,943 | 8/1991 | Kishida | 358/459 |
| 5,079,721 | 1/1992 | Gershony | 395/132 |
| 5,150,428 | 9/1992 | Leone et al. | 382/50 |

Primary Examiner—Leo Boudreau
Assistant Examiner—Phuoc Tran
Attorney, Agent, or Firm—Ladas & Parry

[57] ABSTRACT

A technique for generating a screened reproduction of an image comprising the steps of providing a representation of an original having input density values representing the grey levels of various locations of the original for a given color separation, defining a desired screen dot arrangement for the image, and writing screen dots in a line by line fashion, wherein each screen dot is made up of a plurality of segments whose length and location determines the dot configuration and whose length and location is determined by a digital operation including interpolation employing screen threshold values at at least two spaced locations and by employing the input density information relating to the original.

8 Claims, 14 Drawing Sheets

METHOD AND APPARATUS FOR GENERATING A SCREENED REPRODUCTION OF AN IMAGE BY DIGITAL INTERPOLATION

FIELD OF THE INVENTION

The present invention relates to screened image reproduction and more particularly to a method and apparatus for electronically generating a screened reproduction of an image.

BACKGROUND OF THE INVENTION

Electronic screening for image reproduction is well known in the art. According to a well known technique described in U.S. Pat. No. 4,456,924 of the present assignee, for each screened dot, a multiplicity of coordinates of a laser plotter are translated into screen-cell coordinates. A corresponding cell memory is preloaded by threshold values, defining a cell memory matrix. Input digitized scanned density values of an image, such as a color separation, are compared with the threshold values, cell by cell. The results provide an on/off control input for a laser plotter.

U.S. Pat. 4,149,183 describes an electronic halftone generator wherein a halftone signal is generated by pulse width modulating or comparing the scanned or video signal with a periodic analog signal having two frequencies and phases to create a dot pattern output which is a function of the frequency and phase of the two combined modulating signals. The halftone reproduction generated has variable dot configurations that are controllable to enable both rotation of the dot pattern and geometric modifications of the dot pattern.

U.S. Pat. 5,079,721 of the present inventor and assignee describes a technique for generating a screened reproduction of an image comprising the steps of:

providing a representation of an original having input density values representing the grey levels of various locations of the original for a given color separation, defining a desired screen dot arrangement for the image, and writing screen dots in a line by line fashion, wherein each screen dot is made up of a plurality of lines whose length and location determines the dot configuration and whose length and location is determined by an analog operation employing the input density values of the original and the desired screen dot arrangement.

SUMMARY OF THE INVENTION

The present invention seeks to provide an improved technique for generating a screened reproduction of an image.

There is thus provided in accordance with a preferred embodiment of the present invention a technique for generating a screened reproduction of an image comprising the steps of providing a representation of an original having input density values representing the grey levels of various locations of the original for a given color separation, defining a desired screen dot arrangement for the image, and writing screen dots in a line by line fashion, wherein each screen dot is made up of a plurality of segments whose length and location determines the dot configuration and whose length and location is determined by a digital operation including interpolation employing screen threshold values at at least two spaced locations and by employing the input density information relating to the original.

There is also provided in accordance with a preferred embodiment of the present invention apparatus for generating a screened reproduction of an image comprising an input device for receiving a representation of an original having input density values representing the grey levels of various locations of the original for a given color separation and a desired screen dot arrangement for the image, and a marker for writing screen dots in a line by line fashion, wherein each screen dot is made up of a plurality of segments whose length and location determines the dot configuration and whose length and location is determined by a digital operation including interpolation employing screen threshold values at at least two spaced locations and by employing the input density information relating to the original.

In accordance with a preferred embodiment of the present invention the length and location of the plurality of segments is determined by digitally comparing the input density information with the results of the interpolation.

Additionally in accordance with a preferred embodiment of the present invention, the screen threshold values employed in the interpolation are all located on a given line. Alternatively, the screen threshold values may be located on various lines within a given vicinity.

In accordance with a preferred embodiment of the present invention, each written line has resolution along its length which is finer than that of the input density information and that of the screen threshold values.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

Figure 1:
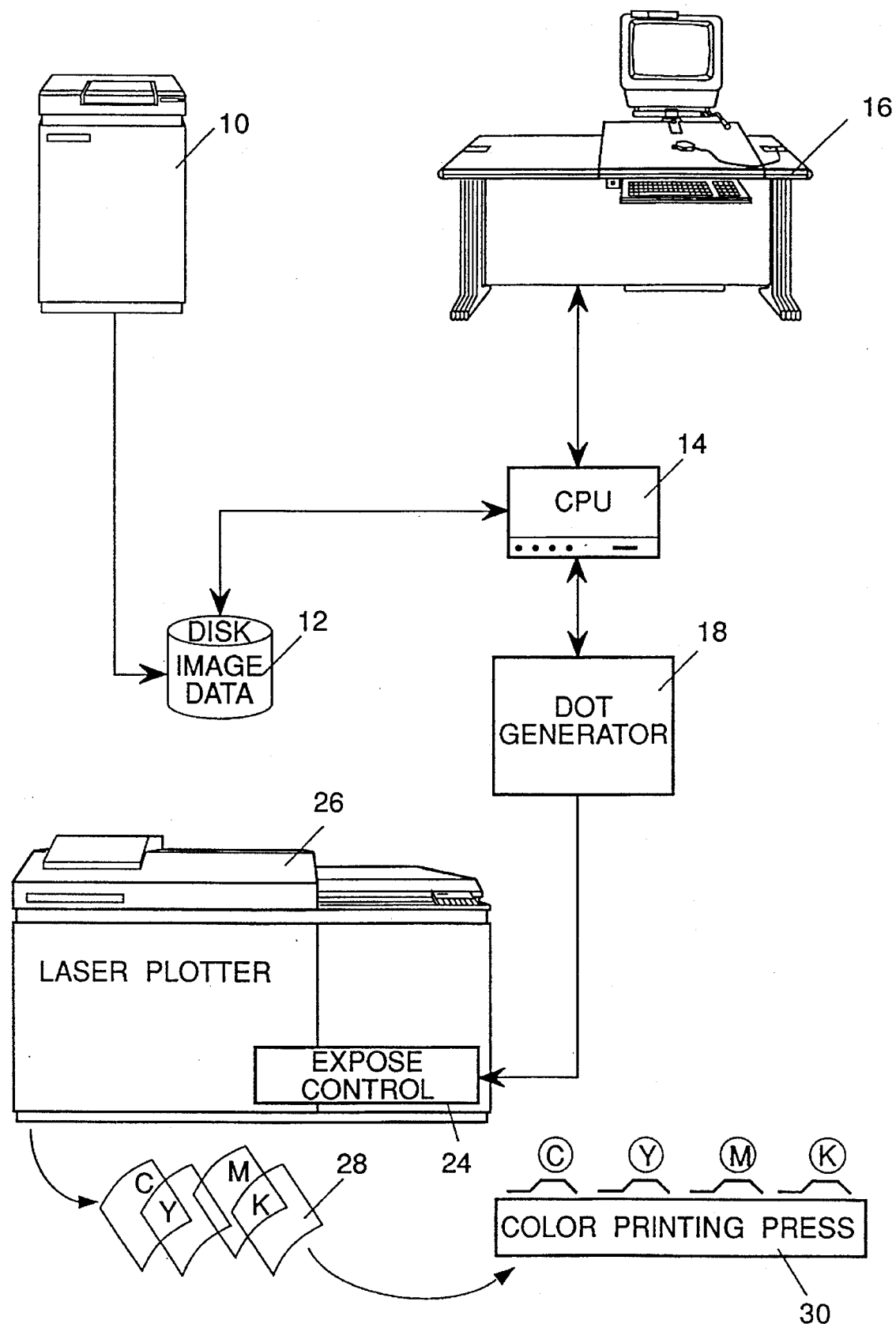
FIG. 1 is a simplified block diagram illustration of a process color printing system constructed and operative in accordance with a preferred embodiment of the present invention.

Reference is now made to FIG. 1, which illustrates a system for generating a screened reproduction of an image constructed and operative in accordance with a preferred embodiment of the present invention. The system preferably comprises a color separation scanner 10, such as a Scitex Smart Scanner, manufactured and sold by Scitex Corporation Ltd. of Herzlia, Israel, which is adapted to provide a digital color separation output of a color original.

The digital output of scanner 10 is normally stored on a image data disc 12 or any other suitable storage medium, which is accessible by a CPU 14, such as an Intel 80386. Interfacing with the CPU 14 is an interactive workstation 16, such as a Scitex Prisma, manufactured and sold by Scitex Corporation Ltd. of Herzlia, Israel.

CPU 14 interfaces with screen dot generation circuitry 18, which in turn provides a control output to laser beam control circuitry 24 in a laser plotter 26, such as a Raystar, manufactured and sold by Scitex Corporation Ltd. of Herzlia, Israel.

Laser plotter 26 produces halftone film color separations 28 which are employed in a conventional process color printing press 30, to produce process color prints.

Figure 2:
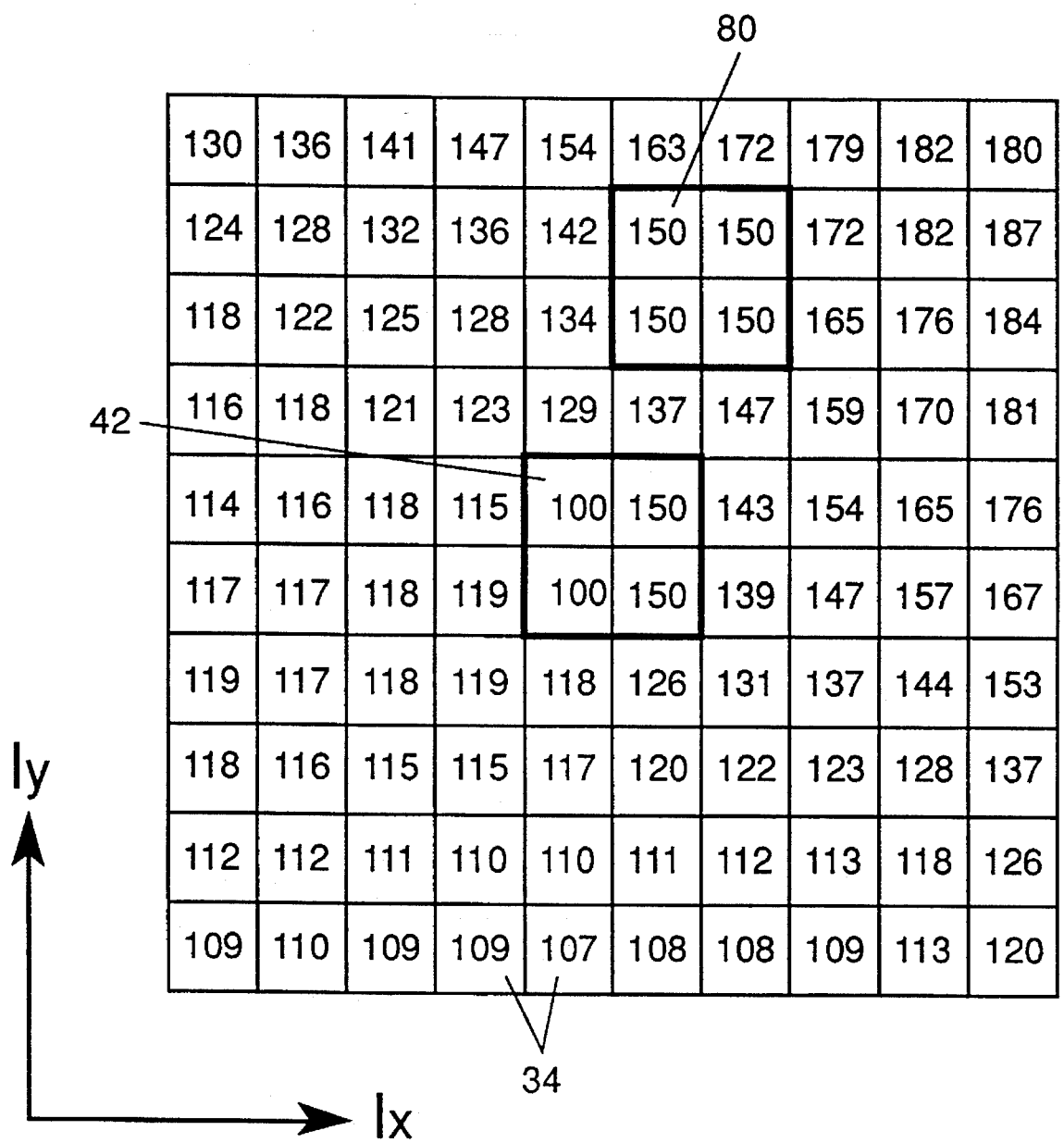
FIG. 2 is an illustration of pixel-by-pixel input density values for a portion of a typical image.

FIG. 2 illustrates the input density values for a portion of a typical image. The portion is shown divided into a first multiplicity of pixels 34 which are arranged along coordinate axes $I_x$ and $I_y$. Pixels 34 typically have a resolution of 100–400 pixels per inch along each of the coordinate axes of the input image.

Each pixel 34 is represented digitally by an input density level. There are typically provided 256 different input density levels, 0 being the lightest and 255 being the blackest.

Figure 3:
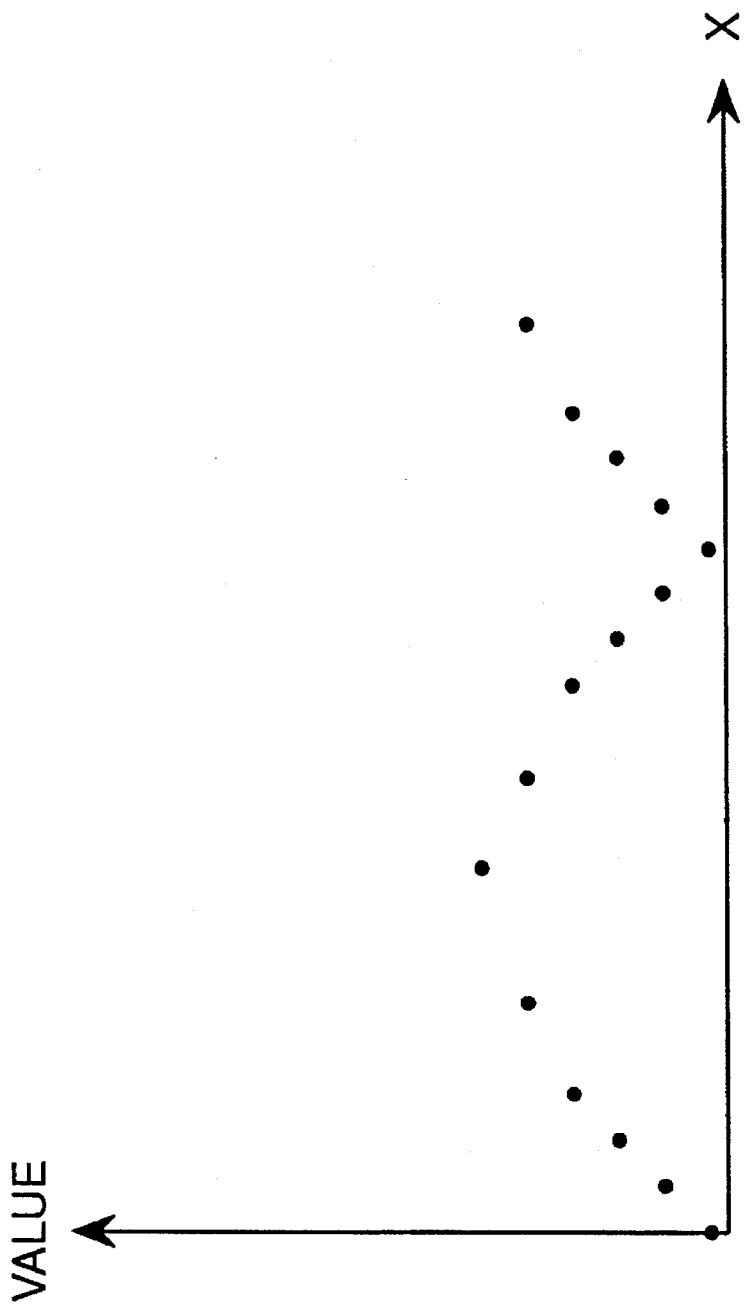
FIG. 3 is an illustration of a collection of typical screen threshold values along a line.

Reference is now made to FIG. 3, which is an illustration of a collection of typical screen threshold values along a line to be produced by a marker, such as laser plotter 26 (FIG. 1). The screen threshold values determine the configuration of the screen and generally are arranged to define dots of selected configurations.

Figure 4:
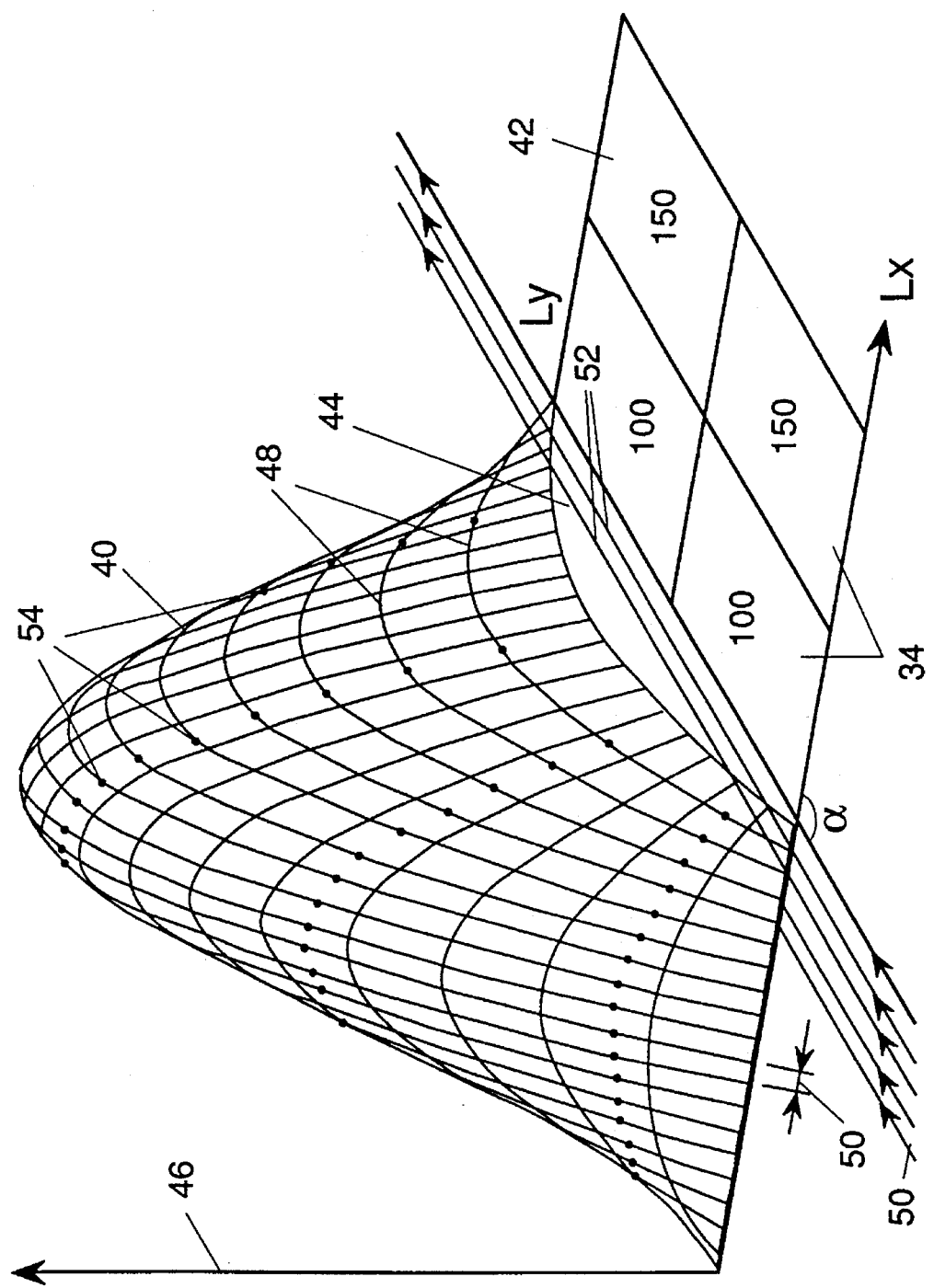
FIG. 4 is an illustration of a collection of typical screen threshold values over a given area.

Reference is now made to FIG. 4, which is an illustration of a collection of typical screen threshold values over a given area. FIG. 4 illustrates an output dot density threshold distribution 40 for a conventional dot which is used in process color printing.

The output dot density threshold distribution 40 is a three dimensional representation of a screen dot arrangement, including a two dimensional space 44 corresponding to the spatial dimensions of the image and a third dimension 46 corresponding to the dot density threshold value at each spatial location thereon. Distribution 40 defines a plurality of sections 48 at a selected angle alpha in the two dimensional space, corresponding to a screening angle, here 90 degrees, for example. The sections 48 are at a section-to-section spacing 50 corresponding to the line to line writing resolution of a plotter, typically 800–5000 lines per inch, each section defining threshold values for locations along a line 52 in the two dimensional space.

A collection of points 54, such as those indicated on distribution 40, illustrate values in the three dimensional space which are stored to define the distribution. Alternatively functions which define, inter alia, the collection of points 54 may be stored to define the distribution. It will thus be appreciated that the screen dot thresholds are stored as discrete values in three dimensional space.

Figure 11:
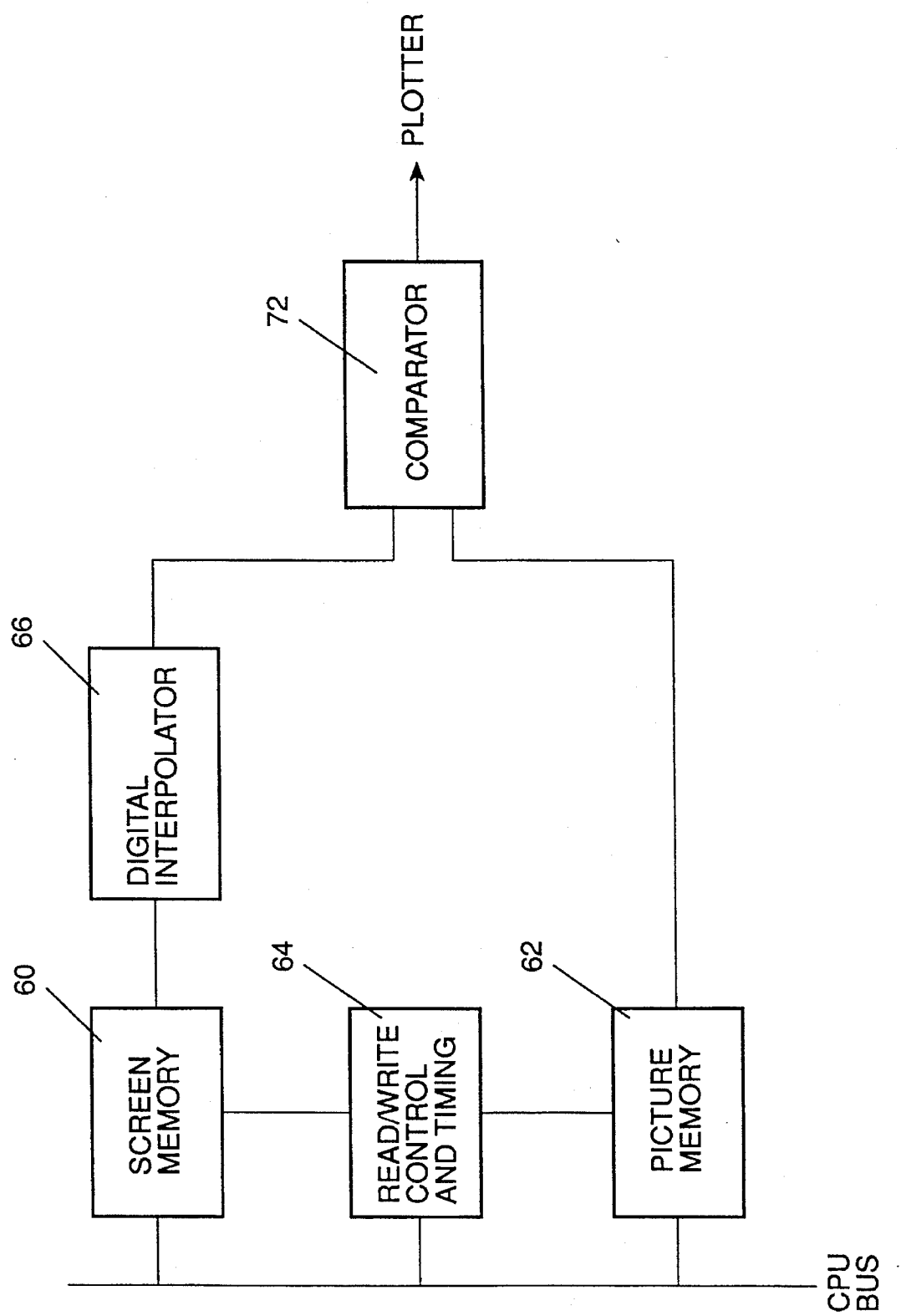
FIG. 11 is a simplified block diagram illustration of apparatus for generating a screened reproduction in accordance with a preferred embodiment of the present invention.

Referring now additionally to FIG. 11, it will be understood that the points 54 are supplied to a screen memory 60, and the input density values of pixels 34 are supplied to a picture memory 62. Screen memory 60 and picture memory 62 are typically controlled by a read/write and timing control unit 64.

Figure 8A:
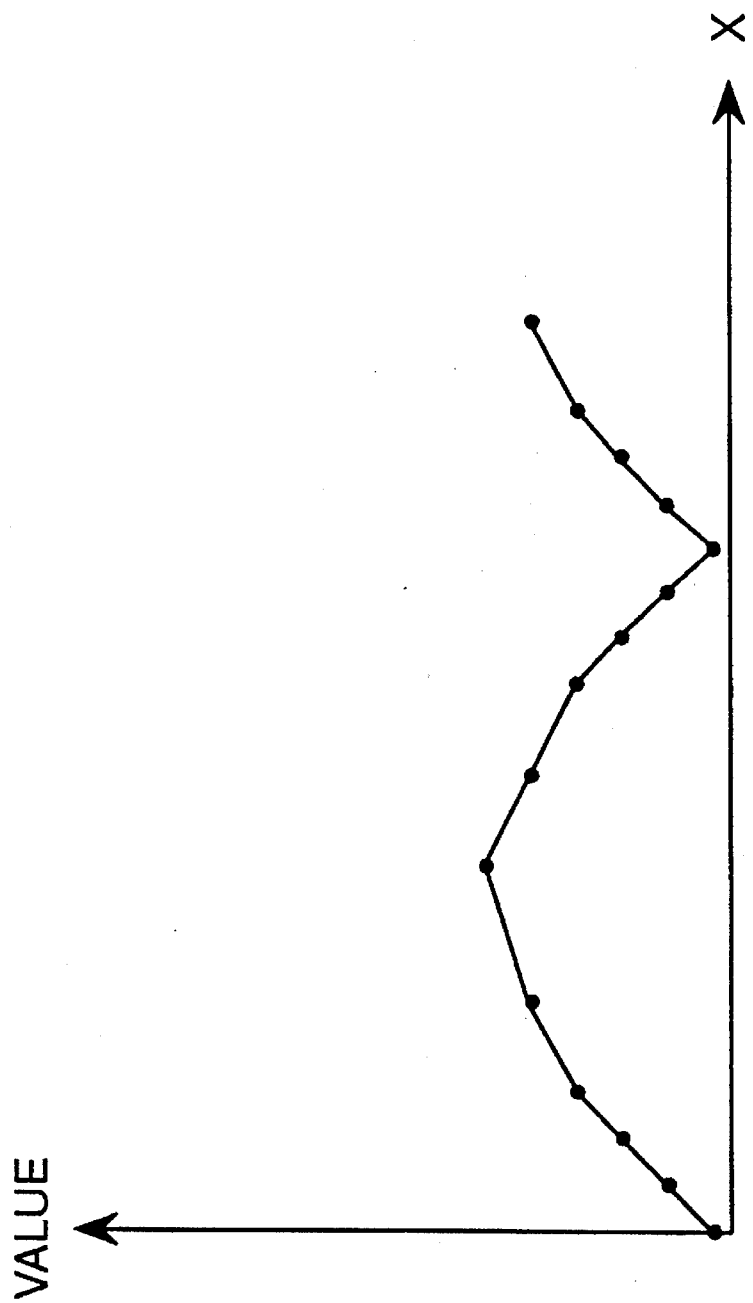
FIGS. 8A and 8B illustrate the results of two alternative interpolation operations on the collection of FIG. 3.
Figure 8B:
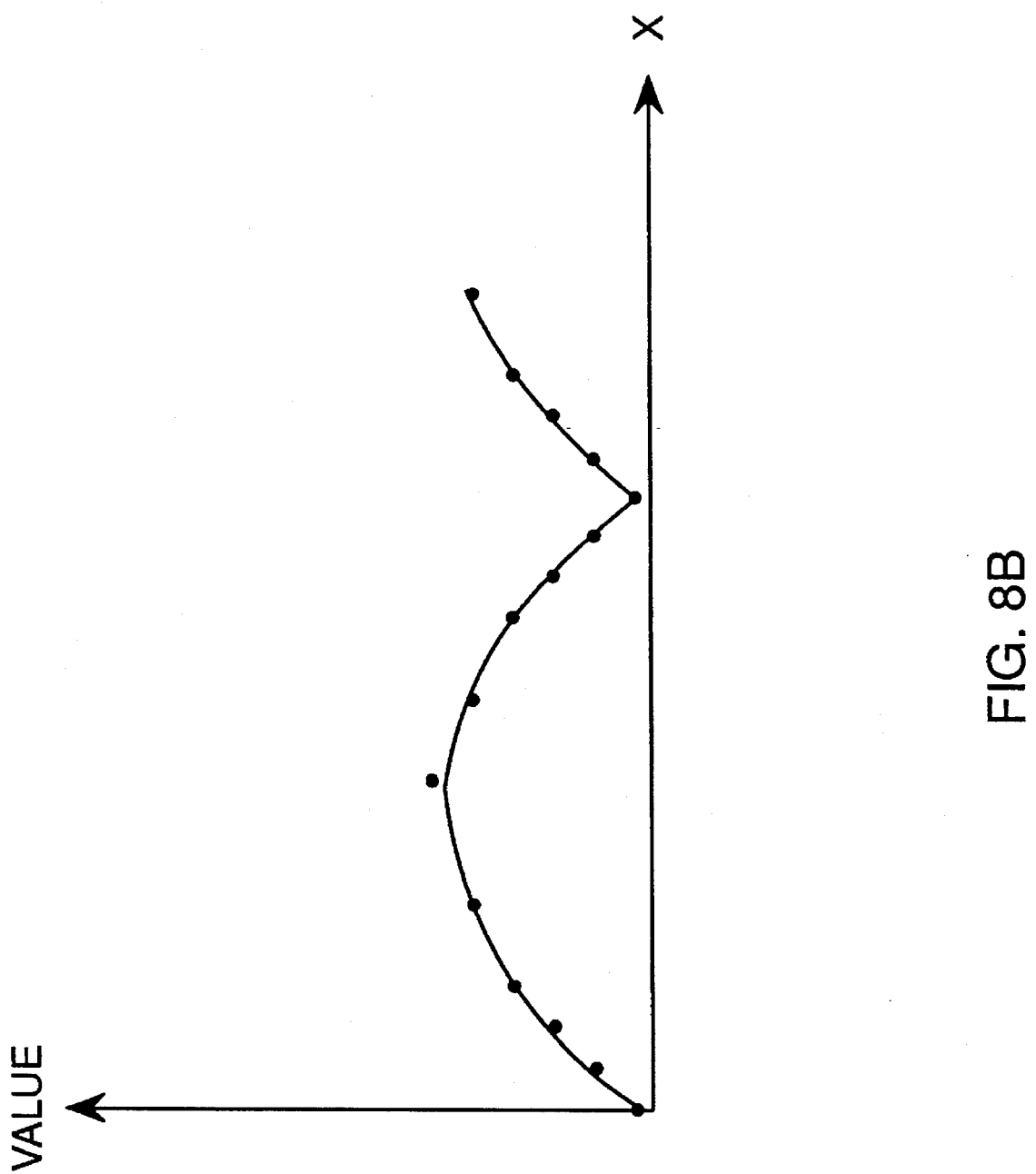

Screen values from screen memory 60 are supplied to a digital interpolator 66 which carries out an interpolation operation, typically such as that shown in either of FIGS. 8A and 8B. The interpolation shown in FIG. 8A is a linear interpolation, while the interpolation shown in FIG. 8B is a smooth line interpolation. The output of interpolator 66 and the output of picture memory 62 are supplied to a comparator 72, which provides an output indication to expose control circuitry 24 (FIG. 1), indicating when the laser plotter 26 is to write. It is noted that there may also be provided various additional control functions, such as intensity control, to enhance the operation of the laser plotter 26.

It is appreciated that the apparatus of FIG. 11 is suitable also for use with the collection of screen values illustrated in FIG. 3.

Figure 5:
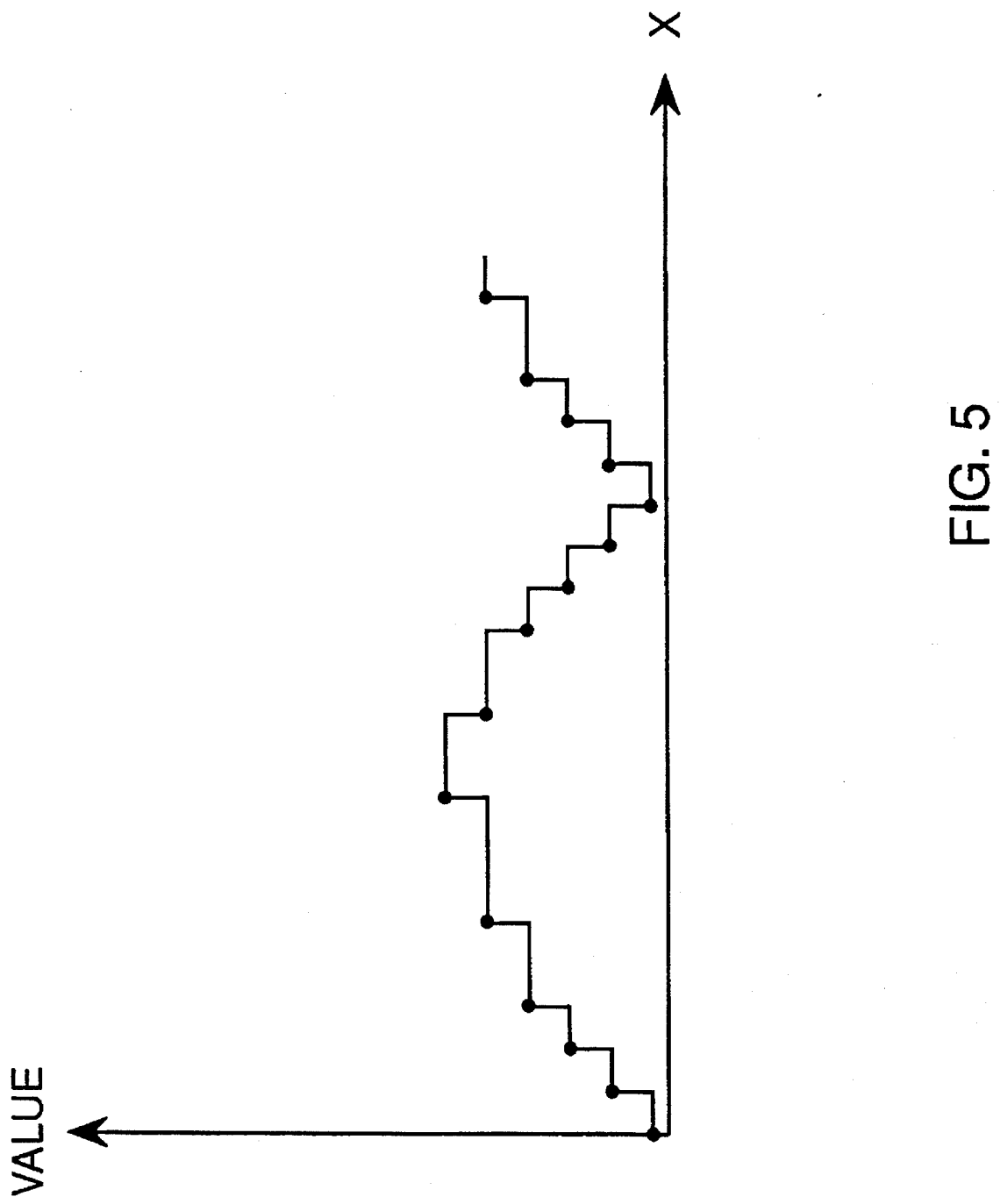
FIG. 5 is an illustration of one example of the use of screen values in the prior art.

In order that the invention be understood clearly, reference is made to FIG. 5, which illustrates graphically the manner in which the screen values are employed in one example of prior art apparatus. It is seen from a consideration of FIG. 5, that each given screen value is employed not only at the location which it actually represents but also all along the X axis until an adjacent screen value location is reached.

The present invention seeks to replace the use of a given screen value between adjacent screen value locations, by changing intermediate values. These intermediate values are arrived at by a predetermined interpolation operation, preferably employing at least two adjacent values.

Figure 6:
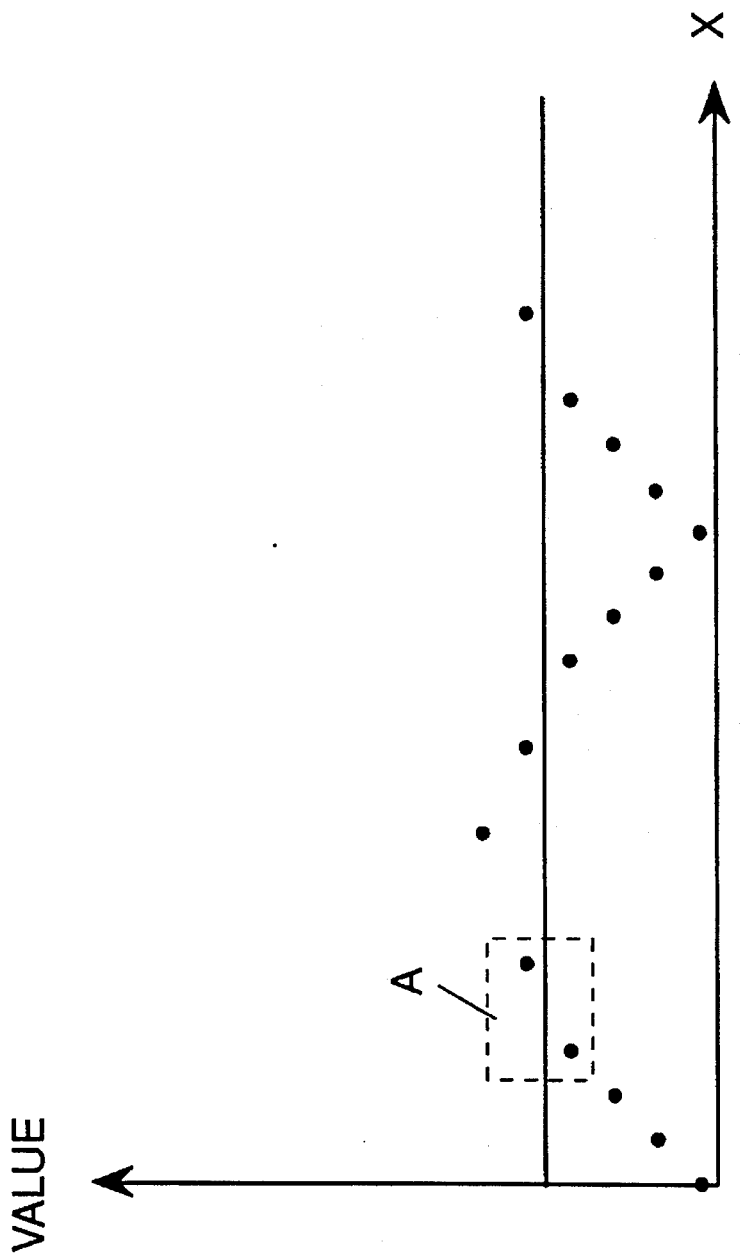
FIG. 6 is an illustration of the collection of typical screen threshold values along a line, as seen in FIG. 3 with the overlay of a typical uniform input density value.
Figure 7:
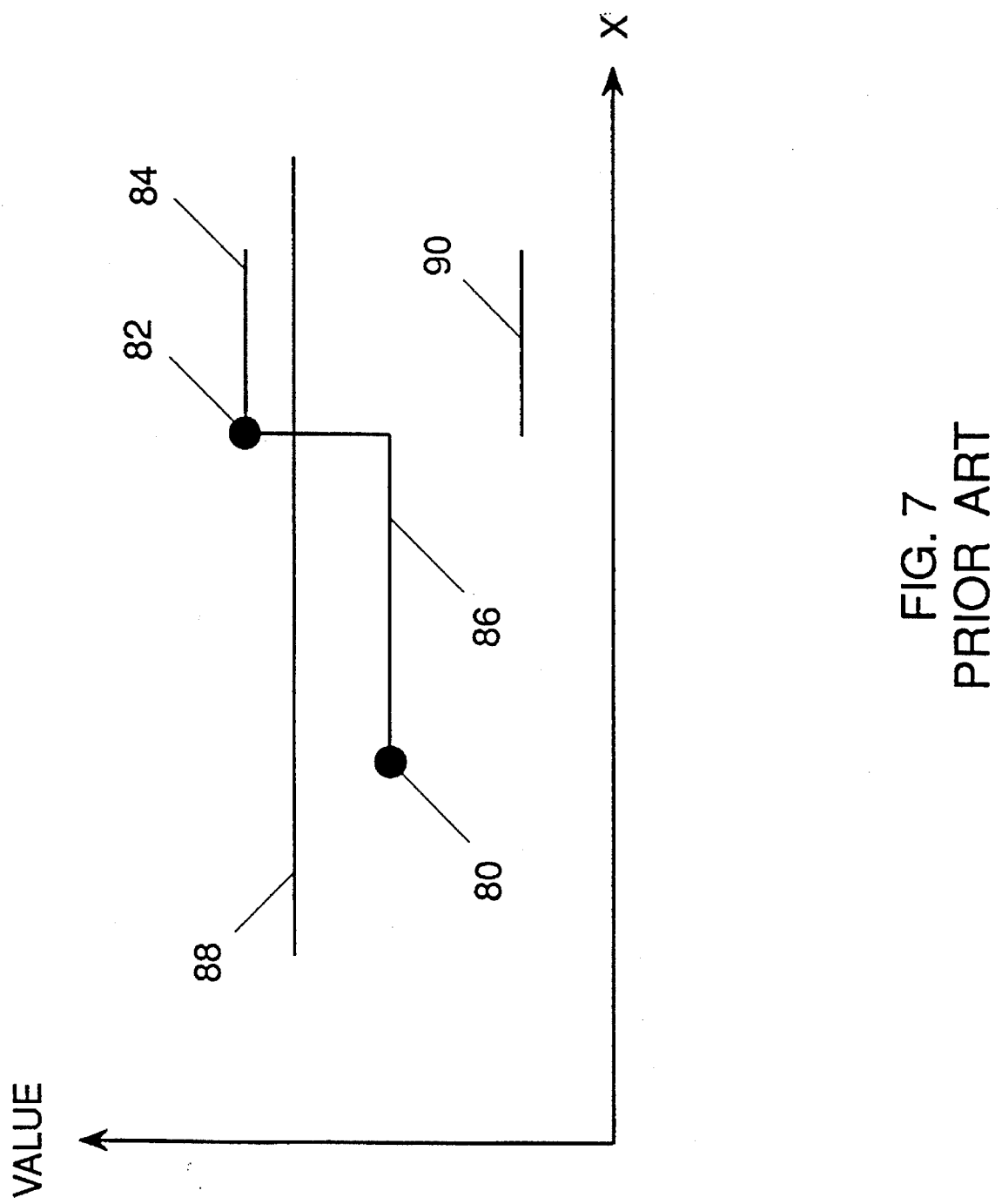
FIG. 7 is an illustration of the comparison of screen threshold values and an input density value for a portion of the collection of FIG. 6, indicated by A in accordance with one example of the prior art.

FIG. 6 is an illustration of the collection of typical discrete screen threshold values along a line, as seen in FIG. 3, with the overlay of a typical uniform input density value. Consideration will now be given to screening in the area designated by reference A:

In this connection, reference is made to FIG. 7, which is an illustration of the comparison of screen threshold values and an input density value for a portion of the collection of FIG. 6, indicated by A in accordance with one example of the prior art. In this illustration, the screen threshold values at locations along the X axis for a given line, are indicated by reference numerals 80, 82 and 84. The line joining these values, which is indicated by reference numeral 86, corresponds to part of the plot shown in FIG. 5.

A constant input density value along the X axis is indicated by a line 88. A marked line, forming part of a screening dot, produced by the comparison of the screen threshold values and the input density value is indicated by reference numeral 90.

It is seen that as the marker progresses along the X axis, the input density remains above the screen threshold until location 82 is reached and then immediately shifts to be below the screen threshold. Once the input density falls below the screen threshold the marker begins to write a line segment 90. It is appreciated that in this prior art realization, the beginnings and ends of line segments can only occur at screen threshold locations and nowhere else along the continuum of the X-axis, thus limiting the resolution of the line segments to the resolution of the screen.

The present invention enables the beginnings and ends of line segments to occur at locations between the screen threshold locations all along the continuum of the X-axis, thus removing the above-described limitation of the resolution of the line segments.

Figure 9A:
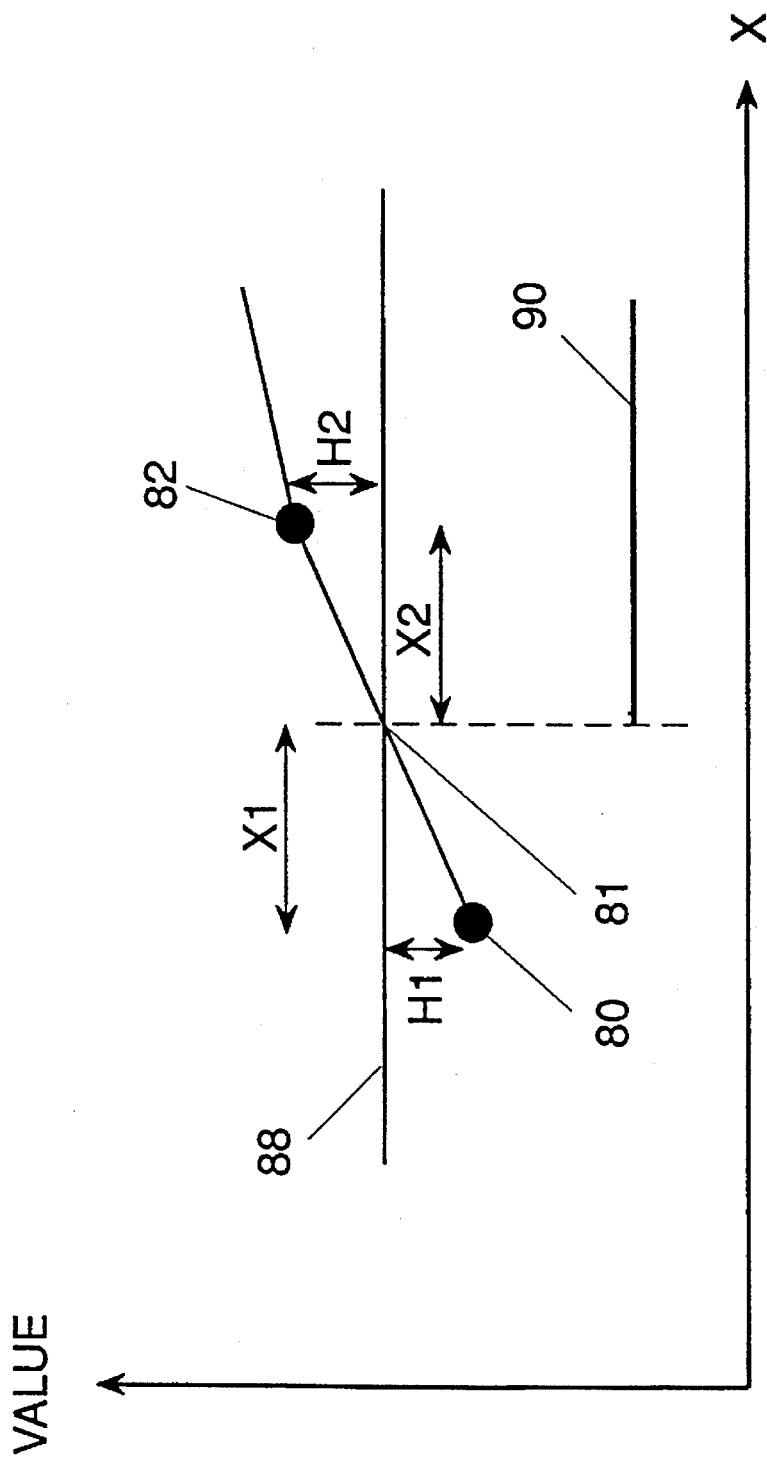
FIGS. 9A and 9B are illustrations of the comparison of interpolated screen threshold values and an input density value for a portion of the collection of FIG. 6, indicated by A in accordance with two alternative embodiments of the invention, which employ the respective interpolation techniques illustrated in FIGS. 8A and 8B.
Figure 10:
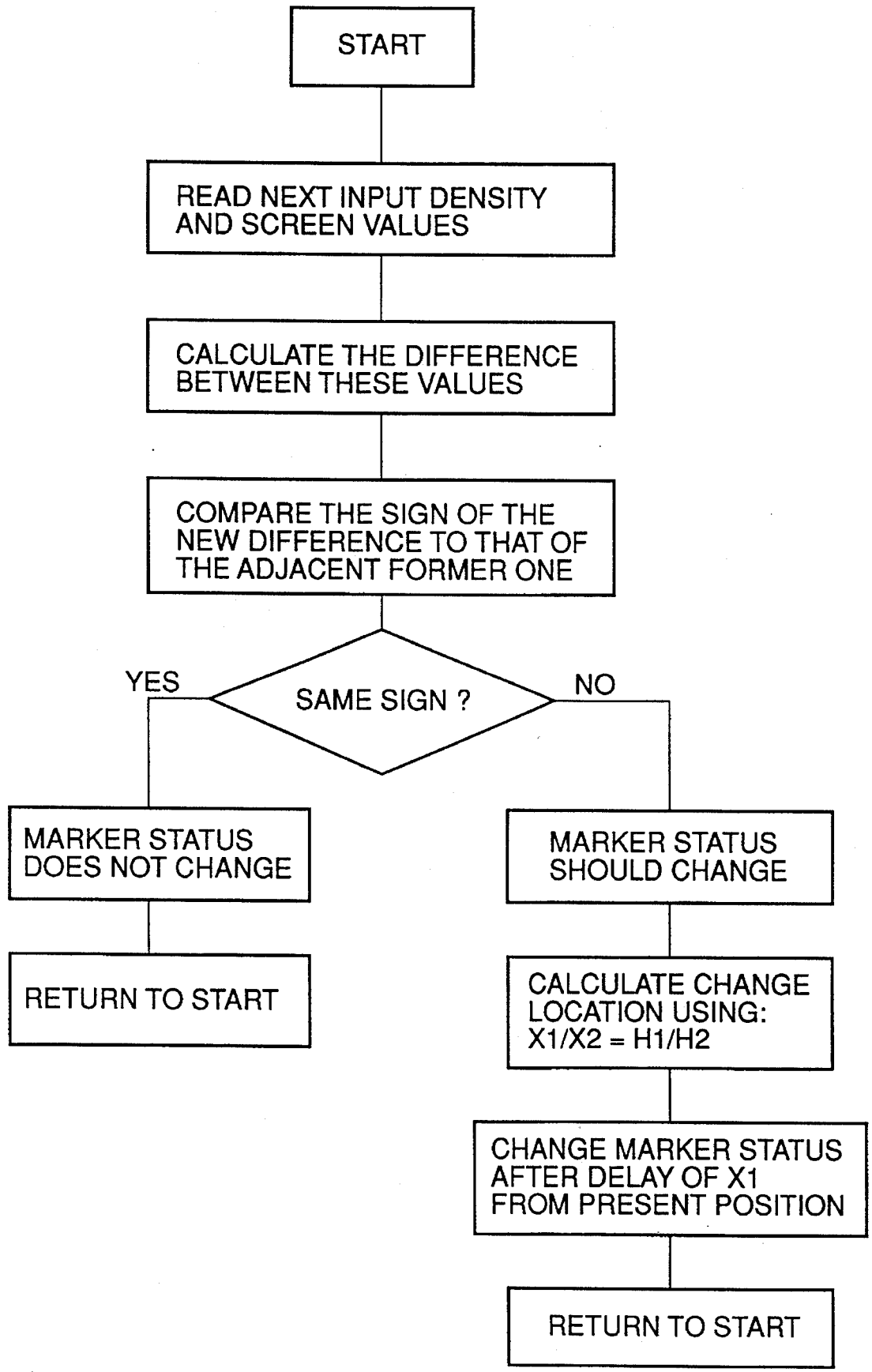
FIG. 10 is a flow chart illustration of the technique for generating a screened reproduction in accordance with the technique illustrated in FIG. 9A.
Figure 12:
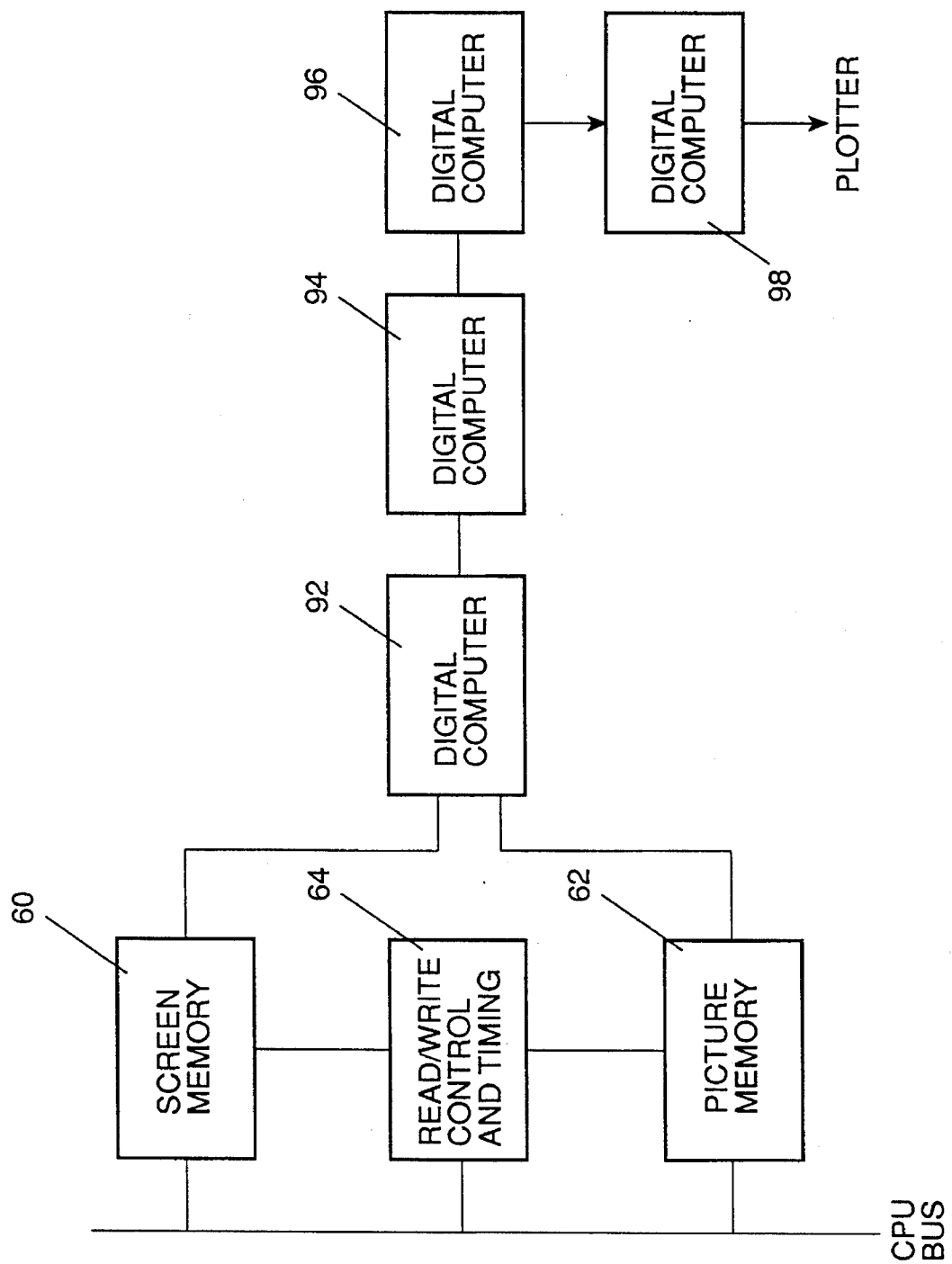
FIG. 12 is a simplified block diagram illustration in greater detail than that of FIG. 11, showing one preferred embodiment of apparatus for generating a screened reproduction.

Reference is now made to FIGS. 9A, 10 and 12 which illustrate a screening technique and apparatus operative in accordance with a preferred embodiment of the invention.

The technique of FIGS. 9A, 10 and 12 calculates the precise start and end of each line segment along the X axis on the basis of repetitive calculations of the difference between screen values and image density values at a multiplicity of points along the X axis.

Once the sign of the difference changes, which can only occur at a screen threshold location, a change in the status of the marker is required (Either from OFF to ON, or from ON to OFF). In contradistinction to the prior art, where the status of the marker is only changed at screen threshold locations, here, the precise location of the marker status change is determined in the following manner:

The intended location of the marker status change 81 is located at a distance X1 from the threshold location 80 and at a distance X2 from the threshold location 82. It is calculated according to the ratio of the differences between the input density and the screen threshold values H1 and H2, at the screen threshold locations 80 and 82, respectively.

It is appreciated that the actual marker operation is delayed somewhat with respect to the foregoing sign change determination and location calculation, such that when the marker position reaches the intended location of marker status change, the information regarding this change is available.

In the absence of sensed sign change, as aforesaid, the marker status remains unchanged.

The apparatus of FIG. 12 thus employs a digital comparator 92 to compare the screen threshold values at the screen threshold locations with the input density value and to provide an output to a difference memory 94 for storing the differences between the input density value and the screen threshold value at adjacent screen threshold locations. A sign change detector 96 receives the stored output from memory 94 and provides a sign change indication to a marker status change location calculator 98. The output of marker status change calculator 98 is provided to expose control circuitry 24 (FIG. 1).

Figure 9B:
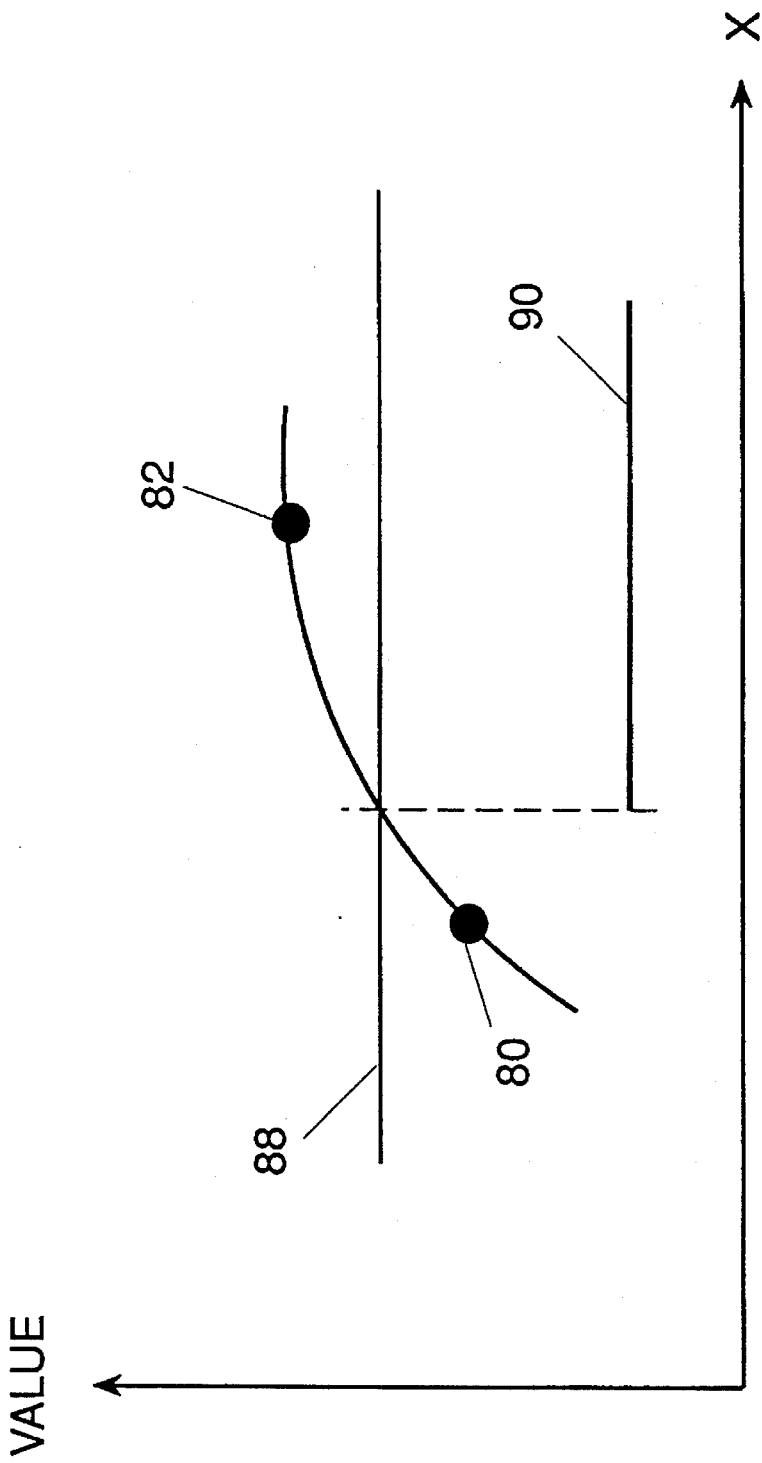

FIG. 9B employs interpolation based on more than two adjacent points in order to create a smoother interpolated screen value function.

It will be appreciated by persons skilled in the art that the present invention is not limited by what has been particularly shown and described hereinabove. Rather the scope of the present invention is defined only by the claims which follow:

We claim:

1. A technique for generating a screened reproduction of an image comprising the steps of:

providing a representation of an original having input density values representing the grey levels of various locations of the original for a given color separation, defining a desired screen dot arrangement for the image, writing screen dots in a line by line fashion, wherein each screen dot is made up of a plurality of segments whose length and location determines the dot configuration and determining the length and location of said segments by a digital operation including interpolation employing screen threshold values at at least two spaced locations and by employing the input density information relating to the original, said length and location of said segments being determined by comparing screen threshold values with the input density value at the same location and determining a beginning and end of each segment, and thereby its length and location thereof, by determining a change in sign between a difference in digital value between the screen threshold values and said input density value and calculating a point at which the input density value is equal to an interpolated value between the screen threshold values, at which the change of sign takes place.

2. A technique according to claim 1 and wherein the screen threshold values employed in the interpolation are all located on a given line.

3. A technique according to claim 1 and wherein the screen threshold values employed in the interpolation are located on various lines within a given vicinity.

4. A technique according to claim 1 and wherein each written line has resolution along its length which is finer than that of the input density information and that of the screen threshold values.

5. Apparatus for generating a screened reproduction of an image comprising:

an input device for receiving a representation of an original having input density values representing the grey levels of various locations of the original for a given color separation and a desired screen dot arrangement for the image, and a marker for writing screen dots in a line by line fashion, wherein each screen dot is made up of a plurality of segments whose length and location determines the dot configuration and means for determining the length and location of said segments by a digital operation including interpolation employing screen threshold values at at least two spaced locations and by employing the input density information relating to the original, said means for determining the length and location of said segments including a digital comparator comparing the input density with the screen threshold values, a sign change detector receiving output from said digital comparator to determine a change in sign between a difference in digital value between the screen threshold values and said input density and a marker status change calculator connected to said sign change detector to calculate a point at which the input density is equal to an interpolated value between the screen threshold value at which the sign change takes place to output signals representing beginning and end of each said segment and thereby the length thereof.

6. Apparatus according to claim 5 and wherein the screen threshold values employed in the interpolation are all located on a given line.

7. Apparatus according to claim 5 and wherein the screen threshold values employed in the interpolation are located on various lines within a given vicinity.

8. Apparatus according to claim 5 and wherein each written line has resolution along its length which is finer than that of the input density information and that of the screen threshold values.

* * * * *